United States Patent
Walma

(10) Patent No.: US 9,788,389 B1
(45) Date of Patent: Oct. 10, 2017

(54) COLOR TEMPERATURE ALIGNMENT OF LUMINAIRE INTEGRATED SENSOR STATUS INDICATOR LIGHT

(71) Applicant: Kenneth Dale Walma, Peachtree City, GA (US)

(72) Inventor: Kenneth Dale Walma, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 15/255,754

(22) Filed: Sep. 2, 2016

Related U.S. Application Data

(60) Provisional application No. 62/213,856, filed on Sep. 3, 2015.

(51) Int. Cl.
    *H05B 33/08*     (2006.01)
    *H05B 37/02*     (2006.01)

(52) U.S. Cl.
    CPC ..... *H05B 33/0872* (2013.01); *H05B 33/0896* (2013.01); *H05B 37/0227* (2013.01)

(58) Field of Classification Search
    CPC ............ H05B 33/0842; H05B 33/0857; H05B 33/0872
    USPC ......................................... 315/129, 294, 309
    See application file for complete search history.

(56) References Cited

U.S. PATENT DOCUMENTS

| | | | |
|---|---|---|---|
| 8,018,166 B2 * | 9/2011 | Soccoli .............. | H05B 37/0209 315/129 |
| 8,346,403 B2 * | 1/2013 | Goyal ................ | H05B 37/0227 315/294 |
| 8,646,936 B2 * | 2/2014 | Goyal .................... | F21S 8/035 315/294 |

* cited by examiner

*Primary Examiner* — Thuy Vinh Tran
(74) *Attorney, Agent, or Firm* — King & Spalding LLP

(57) ABSTRACT

An indoor lighting fixture that includes a sensor to sense a condition associated with an indoor space and a first light source to emit an illumination light to illuminate the indoor space. The indoor lighting fixture further includes a second light source to emit a status indicator light to indicate a status from the sensor. A color temperature of the status indicator light is adjustable to substantially match a color temperature of the illumination light.

15 Claims, 5 Drawing Sheets

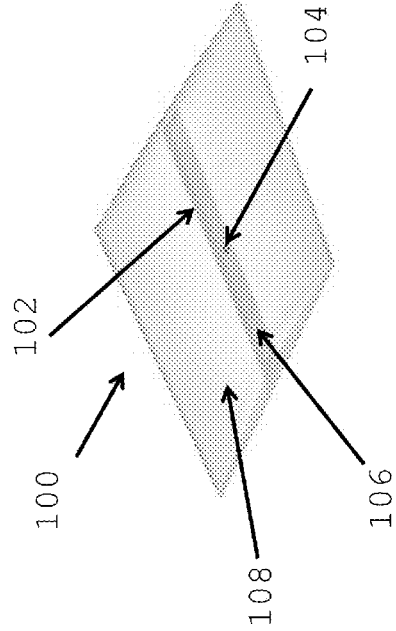
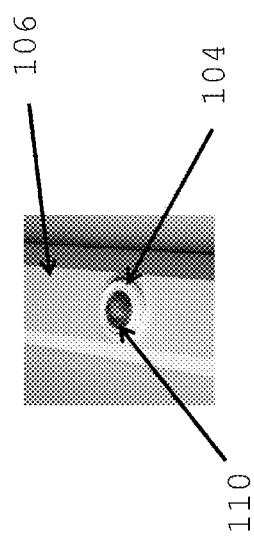
FIG. 1A
FIG. 1B

COLOR TEMPERATURE ALIGNMENT OF LUMINAIRE INTEGRATED SENSOR STATUS INDICATOR LIGHT

CROSS REFERENCE TO RELATED APPLICATIONS

The present application claims priority under 35 U.S.C. Section 119(e) to U.S. Provisional Patent Application No. 62/213,856, filed Sep. 3, 2015, and titled "Color Temperature Alignment of Luminaire Integrated Sensor Status Indicator Light," the entire content of which is incorporated herein by reference.

TECHNICAL FIELD

The present disclosure relates generally to a lighting fixture integrated sensor status indicator light, and more particularly to alignment of color temperature of the integrated sensor status indicator light with the color temperature of light emitted by the lighting fixture.

BACKGROUND

Occupancy and other sensors often include a light source that emits a status indicator light. For example, occupancy sensors often utilize a Red, Green, or Blue status indicator light. The status indicator light may indicate the status of an occupancy sensor such as normal operation, occupant detection, etc. As occupancy and other sensors become smaller, these sensors are becoming integrated into luminaires. As occupancy and other sensors migrate from standalone units to luminaire integrated units, the number of sensors and thus indicators will dramatically increase. For example, several luminaires within a single room may each have an integrated sensor that has a status indicator light. In some circumstances, several status indicator lights may flash at the same time, causing occupants to be unnecessarily alarmed or to react poorly to the high number of colored indicator lights flashing in the ceiling.

Thus, a status indicator light of a luminaire integrated sensor that is aligned with a color temperature of the light emitted by the light source of the luminaire may be desirable.

SUMMARY

The present disclosure relates generally to lighting solutions. In an example embodiment, an indoor lighting fixture that includes a sensor to sense a condition associated with an indoor space and a first light source to emit an illumination light to illuminate the indoor space. The indoor lighting fixture further includes a second light source to emit a status indicator light to indicate a status from the sensor. A color temperature of the status indicator light is adjustable to substantially match a color temperature of the illumination light.

In another example embodiment, an indoor lighting system includes a user input control device and a lighting fixture. The lighting fixture includes a sensor to sense a condition associated with an indoor space, a first light source to emit an illumination light to illuminate the indoor space, and a second light source to emit a status indicator light to indicate a status from the sensor. The color temperature of the status indicator light is adjustable to substantially match a color temperature of the illumination light based on input from the user input control device.

In another example embodiment, an indoor lighting fixture includes a sensor to sense a condition associated with an indoor space, a first light source to emit an illumination light to illuminate the indoor space, and a second light source to emit a status indicator light to indicate a status of the sensor. A color temperature of the illumination light is within a range of white light color temperatures, and a color temperature of the status indicator light is within the range of white light color temperatures.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein:

FIG. 1A illustrates a luminaire with an integrated occupancy sensor according to an example embodiment;

FIG. 1B illustrates a close up view of the integrated occupancy sensor of FIG. 1A according to an example embodiment;

Figure 2:
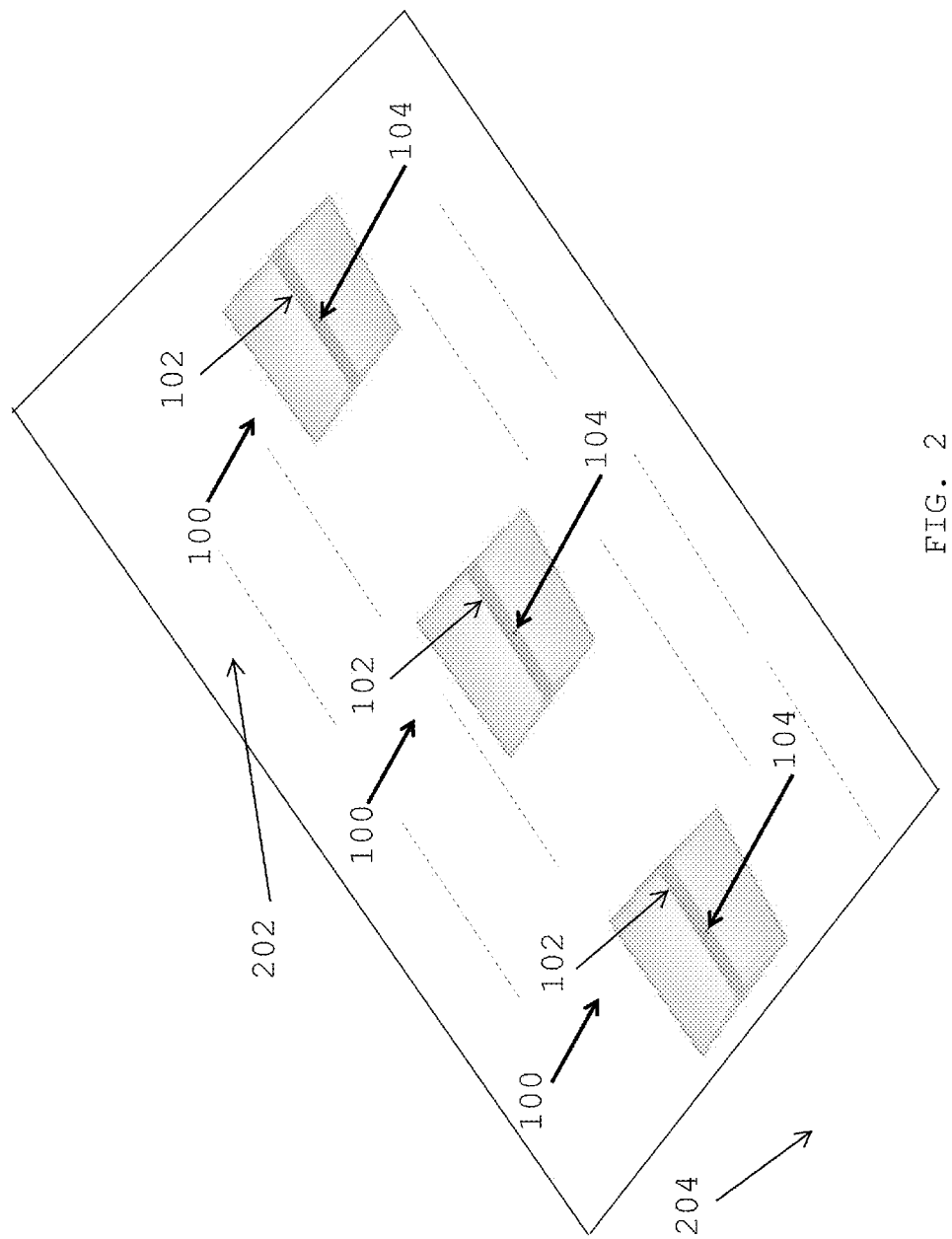
FIG. 2 illustrates several of the luminaires of FIG. 1A installed to illuminate an area according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

DESCRIPTION OF EXAMPLE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

Turning now to the drawings, FIG. 1A illustrates a luminaire 100 with an integrated occupancy sensor according to an example embodiment. FIG. 1B illustrates a close up view of the integrated occupancy sensor of FIG. 1A according to an example embodiment. In some example embodiments, the luminaire 100 may be an indoor luminaire that is installed in a ceiling. Referring to FIGS. 1A and 1B, the luminaire 100 includes a light source 102 that is disposed on a center frame 106. For example, the light source 102 may be disposed hidden from view from below the center frame 106. The light source 102 may be one or more discrete light emitting diodes (LEDs), one or more organic light-emitting diodes (OLEDs), an LED chip on board that includes one or more discrete LEDs, an array of discrete LEDs, or another light source that may be used in place of LEDs. The luminaire 100 may include a reflector 108 to reflect the light emitted by the light source 102 towards the space to be illuminated by the luminaire 100.

In some example embodiments, the luminaire 100 may include an occupancy sensor 104. For example, the occupancy sensor 104 may detect occupants in the space illuminated by the light emitted by the light source 102. To illustrate, the occupancy sensor 104 may be attached to the center frame 106 in view from the space below the luminaire 100 that is illuminated by light from the light source 102. In some example embodiments, the occupancy sensor 104 may include a status indicator light source 110 that emits a status indicator light to indicate a status of the occupancy sensor 104. For example, the status indicator light emitted by the status indicator light source 110 may flash in response to the occupancy sensor 104 detecting one or more occupants in the space illuminated by the light source 102.

The status indicator light source 110 may be one or more discrete light emitting diodes (LEDs), one or more organic light-emitting diodes (OLEDs), an LED chip on board that includes one or more discrete LEDs, an array of discrete LEDs, or another light source that may be used in place of LEDs.

In some example embodiments, the status indicator light source 110 may be selected such that the color temperature of the status indicator light emitted by the status indicator light source 110 is similar to the color temperature of the light emitted by the light source 102 to illuminate the area around the luminaire 100. For example, the color temperature of the illumination light (i.e., the light emitted by the light source 102) may be within a range of white light color temperatures. For example, the color temperature of the illumination light may be less than 3000K, between 3000K and 4500K, or above 4500K. In alternative embodiments, the color temperature of the illumination light may be within a different range without departing from the scope of this disclosure.

In some example embodiments, the color temperature of the status indicator light emitted by the status indicator light source 110 may also be within the same range of color temperatures as the illumination light emitted by the light source 102. For example, the color temperatures of both the illumination light and the status indicator light may be less than 3000K, between 3000K and 4500K, or above 4500K. By having a color temperature within the same range, such as below 3000K, between 3000K and 4500K, or above 4500K, as the illumination light emitted by the light source 102, the status indicator light emitted by the status light indicator source 110 is less alarming to occupants under normal (i.e., non-alarm) conditions than a status indicator light that has a drastically different color temperature.

In some example embodiments, the color temperature of the status indicator light emitted by the status indicator light source 110 may be adjustable. For example, the color temperature of the status indicator light may be adjustable to closely match the color temperature of the illumination light emitted by the light source 102. To illustrate, a driver that controls the color temperature of the illumination light may control color temperature of the status indicator light. For example, when the driver sets or changes the color of the illumination light, the driver may make a corresponding adjustment to the color temperature of the status indicator light. Alternatively, the driver may adjust the color temperature of the status indicator light in response to a user input or a color temperature sensor that senses the color temperature of the illumination light emitted by the light source 102. To change the color temperature of the status indicator light, the driver, for example, may change amount of contribution from different LEDs of the status indicator light source 110 to the color temperature of the status indicator light. For example, the driver may control the amount power provided to the different LEDs of the status indicator light source 110 to adjust the overall color temperature of the status indicator light.

By having a color temperature, fixed or adjustable, that is within the same range as the color temperature of the illumination light emitted by the light source 102, the status indicator light emitted by the status light indicator source 110 is less alarming to occupants under normal (i.e., non-alarm) conditions than a status indicator light that has a drastically different color temperature.

Although the color temperature of the status indicator light emitted by the status indicator light source 110 is adjustable in some embodiments, in some alternative embodiments, the color temperature of the status indicator light may be fixed within the same range as a fixed color temperature of the illumination light emitted by the light source 102 as described above. Although the occupancy sensor 104 is shown centrally positioned between the outside frames of the luminaire, in alternative embodiments, the occupancy sensor 104 may be positioned at a different location on the luminaire 100 without departing from the scope of this disclosure. Although the luminaire 100 is described above as including the occupancy sensor 104, in alternative embodiments, the luminaire 100 may include another type of sensor instead of or in addition to the occupancy sensor 104. Further, the luminaire 100 is intended to illustrate a general indoor luminaire, and the sensor 104 may be integrated into a luminaire that has a different shape and configuration than shown in FIG. 1A without departing from the scope of this disclosure.

FIG. 2 illustrates several of the luminaires 100 of FIG. 1A installed to illuminate an area according to an example embodiment. As illustrated in FIG. 2, multiple luminaires 100 that each include the integrated occupancy sensor 104 may be installed, for example, in a ceiling 202 to illuminate an area 204 below the ceiling 202. The light sources 102 of the luminaires 100 may emit illumination lights that have substantially the same color temperature. For example, the color temperature of the lights emitted by the light source 102 may be within a range of white light color temperatures. For example, the color temperature of the illumination lights may be less than 3000K, between 3000K and 4500K, or above 4500K.

The light emitted by the status indicator light source of each status indicator 104 may also be within a range of white light color temperatures as described above with respect to FIGS. 1A and 1B. For example, the color temperatures of the status indicator lights may be less than 3000K, between 3000K and 4500K, or above 4500K. When the color temperature of the status indicator light emitted by the status indicator light source 110 is reasonably matched with the illumination light emitted by the light source 102, the status indicator light may not be as alarming or uncomfortable to occupants as a status indicator light that has a significantly different color temperature.

In some example embodiments, the color temperature of status indicator light emitted by each status indicator light source 110 may be adjustable as described above with respect to FIGS. 1A and 1B. For example, the color temperature of the status indicator light emitted by each status indicator light source 110 of each luminaire 100 may be adjustable to closely match the color temperature of the illumination light emitted by the light source 102 of the particular luminaire 100. To illustrate, a driver that controls the color temperature of an illumination light emitted by the light source 102 of a particular luminaire 100 may also control color temperature of the status indicator light emitted by the status indicator light source 110 of the particular luminaire. Alternatively, the driver may adjust the color temperature of the status indicator light of each luminaire 100 in response to a user input or a color temperature sensor that senses the color temperature of the illumination light emitted by one or more of the luminaires 100.

Figure 3:
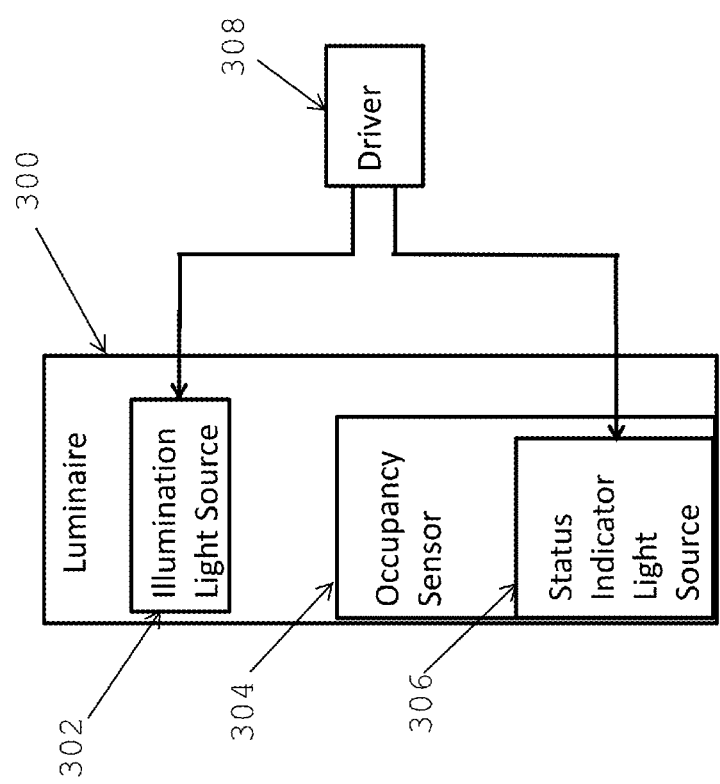
FIG. 3 illustrates a luminaire with an integrated occupancy sensor and a driver according to another example embodiment.

FIG. 3 illustrates a luminaire 300 with an integrated occupancy sensor 304 and a driver 308 according to another example embodiment. In some example embodiments, the luminaire 300 may correspond to the luminaire 100 of FIG. 1A. As illustrated in FIG. 3, the luminaire 300 may include an illumination light source 302 that emits an illumination light, and the occupancy sensor 304. For example, the illumination light source 302 may correspond to the light source 102, and the occupancy sensor 304 may correspond to the occupancy sensor 104. The occupancy sensor 304 may include a status indicator light source 306 that emits a status indicator light. The status indicator light source 306 may correspond to the status indicator light source 110 of FIG. 1B.

In some example embodiments, the luminaire 300 is coupled to a driver 308. For example, the driver 308 may be an LED driver that provides power to the illumination light source 302 and to the status indicator light source 306. The driver 308 may be coupled to a mains power source. The status indicator light source 306 may be designed to emit a status indicator light that has a color temperature that is within a range of white light color temperatures. The driver 308 may be designed to adjust the color temperature of the light emitted by the illumination light source 302 and the color temperature of the light emitted by the status indicator light source 306.

In some alternative embodiments, the driver 308 may not adjust the color temperature of the status indicator light. Instead, adjustment of the color temperature of the status indicator light may be performed outside of the driver 308. In some example embodiments, the driver 308 may adjust the color temperature of the status indicator light based on the color temperature of the illumination light emitted by the illumination light source 302 that is sensed by a color temperature sensor. Alternatively, the driver 308 may not adjust the color temperature of the status indicator light based on the color temperature of the illumination light emitted by the illumination light source 302. Instead, the driver 308 may adjust the color temperature of the illumination light and make a corresponding adjustment to the color temperature of the status indicator light when the driver 308 adjusts the color temperature of the illumination light.

As a non-limiting example, the illumination light and the status indicator light may have approximately the same correlated color temperature (CCT) (e.g., approximately 3000K) at power up. When the color temperature of the illumination light is adjusted, for example, to 2700K, the driver 308 may adjust the color temperature of the status indicator light to approximately 2700K in response to the adjustment to the color temperature of the illumination light. The driver 308 may similarly increase the color temperature of status indicator light in response to an increase in the color temperature of the illumination light.

In some example embodiments, the color temperature of the status indicator light may be fixed (i.e., non-adjustable). For example, the color temperature of the status indicator light may be fixed within the same range as a fixed color temperature of the illumination light emitted by the light source 302.

By having a color temperature, fixed or adjustable, that is within the same range as the color temperature of the illumination light emitted by the light source 302, the status indicator light emitted by the status light indicator source 306 can be less alarming to occupants under normal (i.e., non-alarm) conditions than a status indicator light that has a drastically different color temperature.

Although the luminaire 100 is described above as including the occupancy sensor 104, in alternative embodiments, the luminaire 100 may include another type of sensor instead of or in addition to the occupancy sensor 104. In some example embodiments, the driver 308 may be integrated in the luminaire 300 or may be outside of the luminaire 300. In some example embodiments, the driver 308 may provide power and adjust the color temperature of lights emitted by multiple luminaires.

Figure 4:
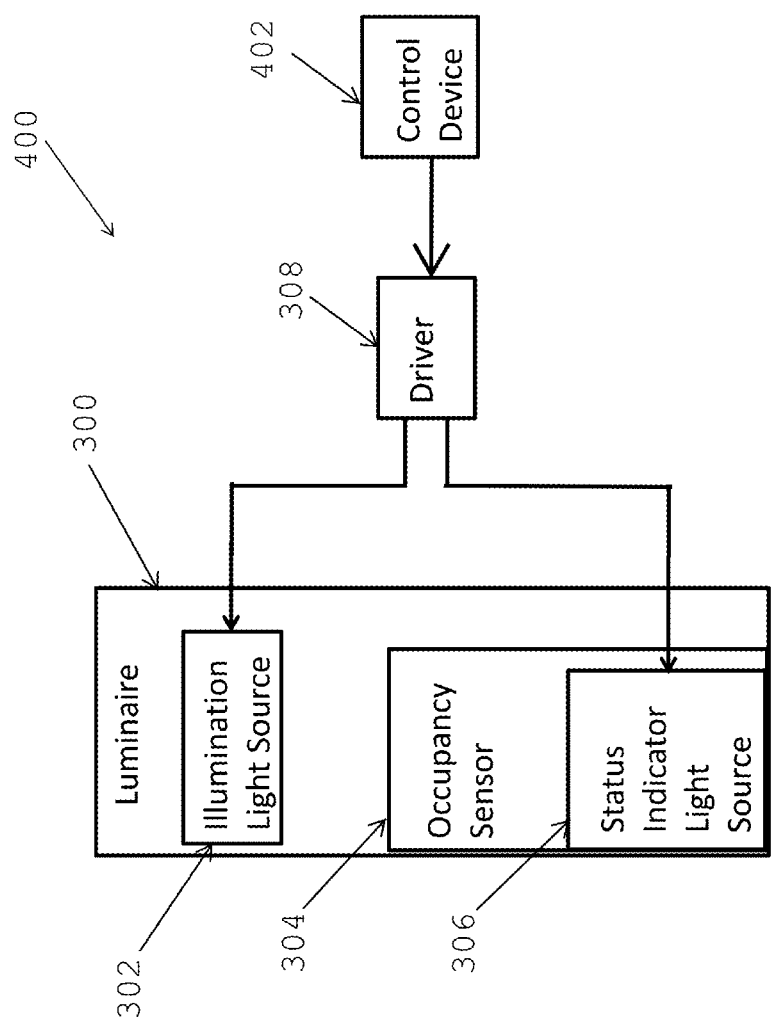
FIG. 4 illustrates a system that includes a luminaire with an integrated occupancy sensor of FIG. 3 and a control device according to another example embodiment.

FIG. 4 illustrates a system 400 that includes the luminaire 300 with an integrated occupancy sensor of FIG. 3 and a control device according to another example embodiment. Referring to FIGS. 3 and 4, in some example embodiments, the driver 308 is coupled to a user input control device 402. For example, the control device 402 may be a wall mounted device or a handheld device. The control device 402 may communicate with the driver via a wired and/or wireless connection. The control device 402 may be used by a user to adjust the color temperature of the status indicator light emitted by the status indicator light source 306.

To illustrate, the driver 308 may receive input from the control device 402 indicating that the color temperature of the status indicator light should be increased or decreased and may adjust the color temperature of the status indicator light accordingly. For example, the driver 308 may adjust the color temperature of the status indicator light when the color temperature of the illumination light is adjusted as well as based upon input from the control device 402. Alternatively, the driver 308 may adjust the color temperature of the status indicator light based upon input from the control device 402 to the exclusion of adjustment by the driver, without user input, in correlation with the color temperature of the illumination light.

For example, when the color temperature of the illumination light is, for example, 1800K, an occupant may use the control device 402 to adjust up or down the color temperature of the status indicator light to approximately 1800K (e.g., in a range of 1700K to 1900K). As another example, when the color temperature of the illumination light is, for example, 3000K, an occupant may use the control device 402 to adjust up or down the color temperature of the status indicator light to approximately 3000K (e.g., in the range of 2900K to 3300K).

In some example embodiments, a user may use the control device 402 to further adjust the color temperature of the status indicator light after the driver 308 adjusts the color temperature in correlation with the color temperature of the illumination light.

Figure 5:
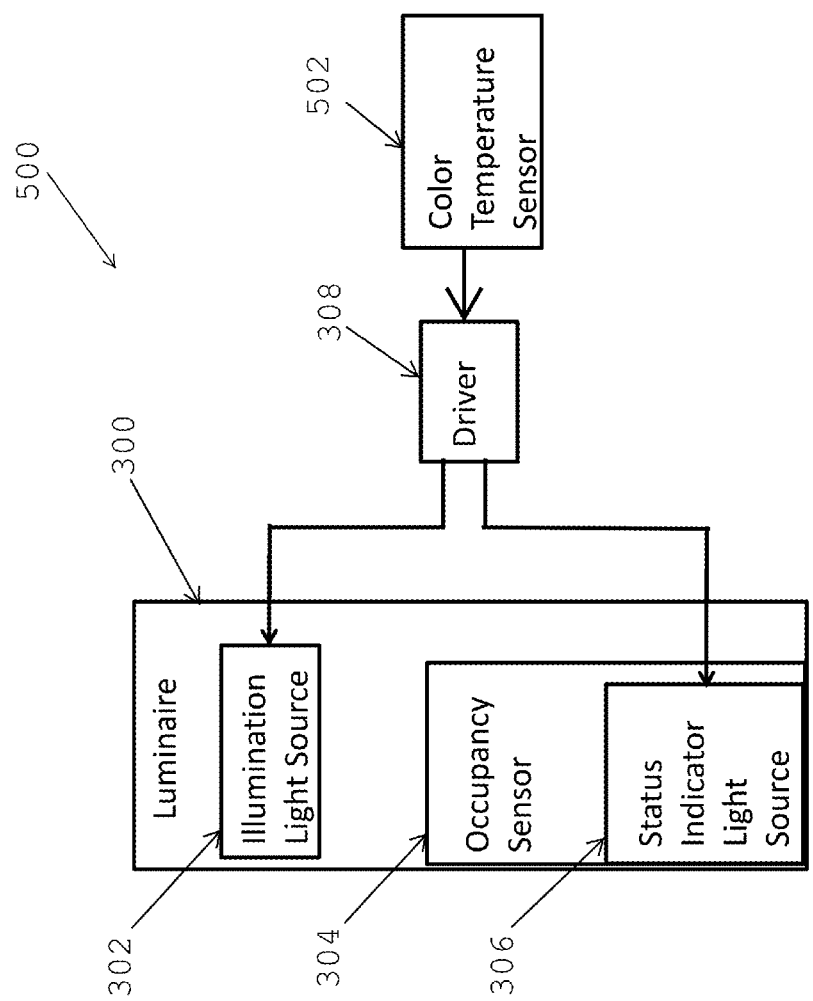
FIG. 5 illustrates a system that includes a luminaire with an integrated occupancy sensor of FIG. 3 and a color temperature sensor according to another example embodiment.

FIG. 5 illustrates a system 500 that includes the luminaire 300 with an integrated occupancy sensor of FIG. 3 and a color temperature sensor 502 according to another example embodiment. Referring to FIGS. 3 and 5, in some example embodiments, a color temperature sensor 502 may be coupled to the driver 308, and the driver 308 may adjust the color temperature of the status indicator light based on information from the color temperature sensor 502. For example, the color temperature sensor 502 may be positioned to sense the color temperature of the illumination light emitted by the illumination light source 302. The color temperature sensor 502 may sense the color temperature of the illumination light and provide information (e.g., via one or more electrical signals) to the driver 308 corresponding to or indicating the sensed color temperature. The driver 308 may then adjust the color temperature of the status indicator light emitted by the status indicator light source 306 to closely match the color temperature of the illumination light emitted by the illumination light source 302. In some example embodiments, the color temperature sensor 502 may provide color temperature information to multiple drivers 308 of multiple luminaires 300.

In some example embodiments, the driver 308 may adjust the color temperature of the status indicator light in correlation with the adjustment of the illumination light by the driver without additional input from the color temperature sensor 502 or the control device 402 as well as based on the input from the control device 402 and/or the color temperature sensor 502.

Although particular embodiments have been described herein, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. An indoor lighting fixture, comprising:
   a sensor to sense a condition associated with an indoor space;
   a first light source to emit an illumination light to illuminate the indoor space; and
   a second light source to emit a status indicator light to indicate a status from the sensor, wherein a color temperature of the status indicator light is adjustable to substantially match a color temperature of the illumination light.

2. The indoor lighting fixture of claim 1, wherein the sensor is an occupancy sensor.

3. The indoor lighting fixture of claim 1, wherein the color temperature of the status indicator light is adjustable based on information indicating the color temperature of the illumination light.

4. The indoor lighting fixture of claim 3, further comprising a color temperature sensor to sense the color temperature of the illumination light, wherein the information indicating the color temperature of the illumination light is provided by the color temperature sensor.

5. The indoor lighting fixture of claim 1, further comprising a driver that adjusts the color temperature of the status indicator light by controlling power provided to the second light source.

6. The indoor lighting fixture of claim 5, wherein the driver adjusts the color temperature of the status indicator light based on adjustment of the color temperature of the illumination light by the driver.

7. The indoor lighting fixture of claim 5, wherein the driver adjusts the color temperature of the status indicator light in response to a user input.

8. An indoor lighting system, comprising:
   a user input control device; and
   a lighting fixture comprising:
      a sensor to sense a condition associated with an indoor space;
      a first light source to emit an illumination light to illuminate the indoor space; and
      a second light source to emit a status indicator light to indicate a status from the sensor, wherein a color temperature of the status indicator light is adjustable to substantially match a color temperature of the illumination light based on an input from the user input control device.

9. The indoor lighting system of claim 8, wherein the sensor is an occupancy sensor.

10. The indoor lighting system of claim 8, wherein the color temperature of the status indicator light is adjustable based on information indicating the color temperature of the illumination light.

11. The indoor lighting system of claim 10, further comprising a color temperature sensor to sense the color temperature of the illumination light, wherein the information indicating the color temperature of the illumination light is provided by the color temperature sensor.

12. The indoor lighting system of claim 8, further comprising a driver that adjusts the color temperature of the status indicator light by controlling power provided to the second light source.

13. The indoor lighting system of claim 12, wherein the driver adjusts the color temperature of the status indicator light based on adjustment of the color temperature of the illumination light by the driver.

14. The indoor lighting system of claim 12, wherein the control device is coupled to the driver and wherein the driver adjusts the color temperature of the status indicator light in response to the input from the user input control device.

15. The indoor lighting system of claim 8, wherein the control device is a wall mounted unit.

* * * * *